UNITED STATES PATENT OFFICE.

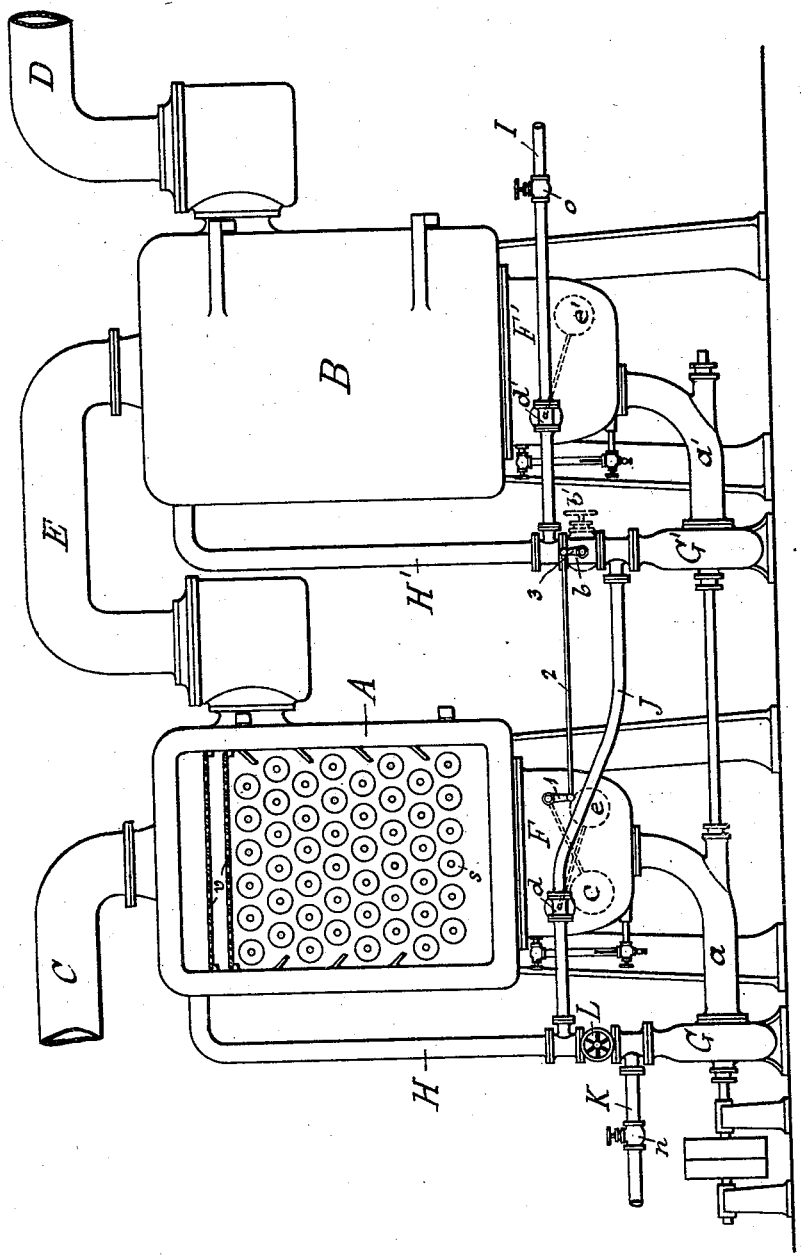

SAMUEL MORRIS LILLIE, OF PHILADELPHIA, PENNSYLVANIA.

PROCESS OF EVAPORATING LIQUIDS IN VACUO AND APPARATUS THEREFOR.

SPECIFICATION forming part of Letters Patent No. 521,215, dated June 12, 1894.

Application filed May 19, 1891. Serial No. 393,250. (No model.)

*To all whom it may concern:*

Be it known that I, SAMUEL MORRIS LILLIE, a resident of Philadelphia, in the county of Philadelphia and State of Pennsylvania, have invented new and useful improvements in processes of multiple-effect evaporation and in multiple-effect evaporating apparatus for practicing the improved processes, of which the following is a specification.

My improved process consists in passing the liquid to be evaporated through the effects in succession, and in continuous flow from effect to effect in the direction of increasing pressures and temperatures, that is, in feeding the dilute liquid which is to be concentrated continuously into the coolest effect of the series, in passing in continuous flow the liquid, in its partially concentrated states, through the progressively hotter effects in succession, and in taking the concentrated liquid away continuously from the hottest effect, after having passed as described through the preceding effects.

My improved apparatus embodies means for causing the liquid, which is to be concentrated, to pass thus through the effects of a multiple effect evaporator against the increasing pressures in the same.

In the drawing the multiple effect is represented by a double effect, of which each effect is of a construction similar to that of the effects shown in United States Patent No. 440,231, issued to me November 11, 1890, viz., one in which the liquid to be evaporated is distributed, by suitable distributing devices, from above over a battery of horizontally arranged evaporating tubes, down and over which it trickles to the floor of the evaporating chamber whence it passes by a suitable conduit to a circulating pump.

In the drawing the figure is an elevation of two evaporators placed side by side and connected to form a multiple effect, of which A is the first or hottest effect—which is shown with the front of its case removed, so as to disclose the evaporating tubes $s$ and the distributing plates $v$, above them, and B is the second or coolest effect, the former being supplied with steam for evaporation by the main C, and the latter being, as a rule, connected to a condenser and vacuum inducing apparatus by a main D.

E is the vapor connection between the two effects.

F and F' are small chambers, one for each effect, into which the liquid being evaporated flows and collects from the evaporating chambers of the effects. These chambers I prefer to place directly underneath the effects, but they may be variously located. From the bottoms of the float chambers, as I shall term them, F F', mains $a\ a'$, respectively lead to the induction ports of the circulating pumps, G for the first effect A, and G' for the second effect B. The discharge pipes H H' of the circulating pumps, which pipes I shall term the "return pipes," lead back to the liquid distributing devices $v$ above the tubes of the respective effects. The return pipe, H', of the second effect contains a valve—shown as a butter fly valve—at $b$, which is operated through the connecting mechanism 1, 2, 3, by the float $c$, shown in dotted lines, which float rests upon the surface of the liquid in the float chamber F of the first effect A. As this float rises it opens the valve $b$, and as it falls it closes the same, the valve being approximately closed when the float rests upon the bottom of the float chamber.

I is the feed pipe for the liquid to be evaporated to the coolest effect B, i. e., it is the feed pipe for the multiple effect. It delivers into the return pipe H' of the effect B at a point between the valve $b$ and the effect, and is provided with a valve $d'$, which is operated by a float $e'$, which rests on the surface of the liquid in the float chamber F' of the effect B, and as it rises closes the valve, and as it falls opens the same.

J is a second discharge pipe for the circulating pump G' of the effect B; as shown, it branches from the return pipe H' of the effect B at a point between the circulating pump G' and the valve $b$, and leads into the return pipe H of the effect A—in the construction shown in the drawing, though it may lead into that effect at any one of a number of places—and is provided with a valve $d$, which is operated by a float $e$, which rests upon the surface of the liquid in the float chamber F, and closes the valve as it rises and opens the same as it falls. In the return pipe H of the hotter effect, a hand valve L is located at a point between the circulating pump G and the place where the feed pipe J joins the return pipe. Between this valve L and the circulating pump a pipe K, the discharge pipe of the system, branches from the return pipe and is provided with a hand valve $n$.

The operation of the regulating devices of this multiple effect, and the course of the liquid in process of concentration through the same are as follows: Assuming the multiple effect to be in full operation with steam for evaporation entering to the tubes of the first effect A by the main C, the vapors from the first effect passing to the tubes of the second effect by the main E, the vapors from the second effect escaping, say to a vacuum inducing apparatus, by the main D, the circulating pumps G and G' to be in action circulating liquid over the evaporating tubes in their respective effects, and the valve $o$ in the feed pipe I wide open. Then the thin liquid to be concentrated flows continuously through the feed pipe I into the effect B, via the return pipe H', and joins the circulating liquid therein in quantities automatically regulated by the float $e'$, in the float chamber F', and valve $d'$, to equal the quantity of liquid passing away from the effect by the pipe J to the effect A, as described below, together with the quantity leaving the effect as vapor through the main D. The flow of liquid through the pipe J into the hotter and higher pressure effect A is effected by the valve $b$ in the return pipe H' automatically operated by the float $c$ in the float chamber F of the effect A to throw sufficient back pressure upon the pump G' to cause the liquid to flow through the pipe J into the return pipe H of the effect A, against the higher pressure in the latter. It is apparent that this float $c$ working through the valve $b$ automatically causes the flow of liquid through the pipe J into the effect A to be equal to the liquid leaving that effect as vapor by the main E, and as thickened liquid by the pipe K, as described below, so long as the limit of capacity of the pipe J or pump G' is not exceeded. Thus, if liquid should at any time be leaving the effect A faster than it was being supplied through the main J, the level of the liquid in the chamber F would fall, and the float $c$ with it, the latter closing the valve $b$, to greater degrees and so increasing the back pressure on the pump and the flow of liquid through the pipe J, and this action of the parts would continue until the rate of flow of liquid through the pipe J was made precisely equal to that of the flow of liquid (and vapor) away from the effect A. Conversely, if at any time (as through the closing of the valve $n$ in the discharge pipe K) the flow of liquid through the pipe J into the effect A should be greater than that passing from the effect as liquid and vapor, the reverse operations would take place, viz., the liquid in the float chamber F would rise, the float $c$ would rise with it, and the valve $b$ in the return pipe H' of the effect B would open, until the back pressure on the pump G' was sufficiently diminished to reduce, to the proper rate, the flow of liquid through the pipe J into the effect A. The pipe J is shown provided with a valve $d$, which is operated by the float $e$, which rests upon the liquid in the float chamber F, the valve closing as the float rises, and opening as the float falls, and consequently adapted to automatically regulate the flow of liquid into the effect A to equal that passing from the effect as liquid and vapor. This valve $d$ is set so as to permit a higher level of liquid in the float chamber, than the float $c$ operating through the valve $b$ does, and consequently plays no part so long as the float $c$ and valve $b$ work normally, and effect a proper regulation of the flow of liquid through the pipe J, but should the latter for any reason be unable to sufficiently restrain the flow of liquid through the pipe J, then the rising liquid in the float chamber F would bring the float $e$ and valve $d$ into full action to automatically govern the said flow, though maintaining the liquid at higher levels in the chamber F than is done by the float $c$ and valve $b$, when they are able properly to control the flow. The valve $b$ may be a valve, as indicated by the dotted outlines at $b'$, operated by hand to maintain a sufficient back pressure upon the pump G', instead of being automatically operated by a float in the chamber F of the effect A. In this case the valve $d$ and float $e$ are entirely depended upon for the automatic control of the flow of liquid through the pipe J from the effect B into the higher pressure effect A. Again when the conditions of work—the differences in pressure between the two effects for example—are to be sufficiently constant, the valve $b$ may be replaced by a fixed restriction placed somewhere in the return pipe having such proportions that when the circulating pump is running at normal speed the restriction will cause sufficient back pressure in the pump to cause the flow of liquid through the branch J into the effect A. With this fixed restriction in the return pipe, should the difference in pressure between the effects A and B become abnormally great at any time, the pump G' might be run faster during the time and thus create a correspondingly increased back pressure. The concentrated liquid flows away from the effect A by the pipe K, which branches from the return pipe H of the effect at a point between the circulating pump G and the point where the pipe J joins the said return pipe. A valve L in the return pipe between the pipes K and J affords means by more or less closing it, of creating sufficient back pressure in the pump G to cause a flow of liquid through the pipe K which flow may be regulated either by the valve $n$ in the pipe K or by varying the back pressure in the pump by means of the valve L. In cases when the liquid being evaporated passes through the multiple effect in sufficient quantities to keep the evaporating tubes properly covered without the aid of liquid returned by the circulating pumps G G',—which might be the case when but a small portion of the liquid has to be vaporized—the valve $b$ in the return pipe H' could be fixed in the closed position, in which case the pump G' would serve merely to pass the liquid from the effect B into the effect A against the higher pressure in the latter.

For purposes of illustration, I have shown in the drawing apparatus in which the liquid in process of evaporation flows down over the outer surfaces of tubes heated from the interior, but my invention is equally applicable to intransit apparatus in which the liquid flows along the interior surfaces of tubes heated from the exterior (to such an apparatus, for example, as is illustrated in Patent No. 378,843, issued to me February 28, 1888), and for the sake of simplicity, I have shown a two pan multiple effect, but it is apparent that the number of pans or effects may be greater, and that, whatever the number, each effect would have the same relation to the next cooler effect of the series, that the effect A bears to the effect B in the apparatus of the drawing.

The method of multiple effect evaporation hitherto practiced consists in sending the liquid to be evaporated down through the effects, in the direction of decreasing pressures and temperatures, the thin liquid being fed into the hottest effect and the concentrated liquid being drawn away from the coolest effect. This mode of operating requires, it is apparent, that all the thin liquid, if cold, be heated to the boiling temperature in the hottest effect before any evaporation can take place from it, and also that the concentrated liquid shall leave the multiple effect comparatively cool, i. e., at the temperature of the coolest effect of the series.

The advantages of my method of multiple effect evaporation are, among others: First, economy of fuel in the concentration of liquids which have low initial temperatures, which economy is due to the fact that the liquid has only to be heated to the temperature of the coolest effect before evaporation takes place, since the liquid is fed into the coolest effect. Second, that viscous liquids can be concentrated to higher degrees, owing to the fact that as the density increases the evaporation is carried on at higher temperatures, that is in the hotter effects, the final concentration being done in the hottest effect of all, and, since the fluidity of a viscous liquid increases with the temperature, the fluidity necessary to the proper working of an effect— to the proper distribution of the liquid over the surfaces of a film evaporator, for example—can be maintained in the hottest effect with a less percentage of water in the liquid, i. e., with the liquid at a greater degree of concentration, than can be done in the coolest effect, and therefore, as above stated, viscous liquids may be concentrated to higher degrees by my improved method of working, than by that hitherto practiced. It is likewise true that most saline solutions can be concentrated to higher degrees by my method without separation of the salts, owing to the salts being more soluble at higher temperatures.

I claim as my invention—

1. In a multiple effect film or intransit evaporating apparatus, the combination with two effects of the same of a pump with its induction port connected to the liquid discharge of the cooler effect of the two to receive liquid therefrom, and having two eduction or discharge pipes, one leading to the hotter effect and the other, a return pipe, delivering through suitable distributing devices upon the evaporating surfaces of the cooler effect, and means in the said return pipe for restricting the flow of liquid through it and thereby creating sufficient back pressure upon the pump to force liquid through the eduction pipe leading to the hotter effect against the higher pressure in the latter, a thin liquid feed pipe for the two effects leading into the coolest effect; and a concentrated liquid discharge pipe for the two effects leading away from the hotter effect, whereby the liquid to be concentrated first enters the cooler effect, and having passed through the two effects in succession as described escapes concentrated from the hotter effect substantially as and for the purpose specified.

2. In a multiple effect film or intransit evaporating apparatus, the combination with two effects of the same of a pump with its induction port connected to the liquid discharge of the cooler effect of the two to receive liquid therefrom, and having two eduction or discharge pipes, one leading to the hotter effect and the other, a return pipe, delivering through suitable distributing devices upon the evaporating surfaces of the cooler effect, means in the said return pipe for restricting the flow of liquid through it and thereby creating sufficient back pressure upon the pump to force liquid through the eduction pipe leading to the hotter effect against the higher pressure in the latter, and a valve in the said pipe leading to the hotter effect and means whereby said valve is automatically operated by the level of the liquid in the hotter effect to control the flow of liquid through the pipe into the hotter effect, substantially as specified.

3. In a multiple effect film or intransit evaporating apparatus, the combination with two effects of the same of a pump with its induction port connected to the liquid discharge of the cooler effect of the two to receive liquid therefrom, and having two eduction or discharge pipes, one leading to the hotter effect and the other, a return pipe, delivering through suitable distributing devices upon the evaporating surfaces of the cooler effect, a valve in the return pipe and means actuated by the rise and fall of the level of the liquid in the hotter effect and connected to the said valve by suitable mechanism operating to open the valve progressively with the rise of the level of the liquid in the hotter effect, and to close the valve progressively with the falling of the level of the said liquid and thereby govern the flow of liquid from the cooler into the hotter effect substantially as specified.

4. In a multiple effect film or intransit evaporating apparatus, the combination with two effects of the same of a pump with its induction port connected to the liquid discharge of the cooler effect of the two to receive liquid therefrom, and having two eduction or discharge pipes, one leading to the hotter effect and the other, a return pipe, delivering through suitable distributing devices upon the evaporating surfaces of the cooler effect, a valve in the return pipe and means actuated by the rise and fall of the level of the liquid in the hotter effect and connected to the said valve by suitable mechanism operating to open the valve progressively with the rise of the level of the liquid in the hotter effect, and to close the valve progressively with the falling of the level of the said liquid and a valve in the pipe leading into the hotter effect with means actuated by the liquid in the hotter effect, and connected to the said valve by suitable mechanism, operating to open and close the valve progressively with the fall and rise of the level of the liquid in the hotter pan respectively, substantially as and for the purpose specified.

S. MORRIS LILLIE.

Witnesses:
MORRIS R. BOCKIUS,
J. W. HURFF.